(12) United States Patent
McGrath et al.

(10) Patent No.: US 11,698,025 B2
(45) Date of Patent: Jul. 11, 2023

(54) OIL LEAKAGE MONITORING SYSTEM

(71) Applicant: PRATT & WHITNEY CANADA CORP., Longueuil (CA)

(72) Inventors: Darragh McGrath, Montreal (CA); Michel Labbe, Montreal (CA); Sean Powers, Sainte-Julie (CA); Pierre Gauvin, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 59 days.

(21) Appl. No.: 17/175,174

(22) Filed: Feb. 12, 2021

(65) Prior Publication Data

US 2021/0254548 A1 Aug. 19, 2021

Related U.S. Application Data

(60) Provisional application No. 62/976,741, filed on Feb. 14, 2020.

(51) Int. Cl.
*F02C 7/06* (2006.01)
*F01M 11/12* (2006.01)
*F01M 11/00* (2006.01)

(52) U.S. Cl.
CPC ............ *F02C 7/06* (2013.01); *F01M 11/0004* (2013.01); *F01M 11/12* (2013.01); *F05D 2220/32* (2013.01); *F05D 2260/98* (2013.01)

(58) Field of Classification Search
CPC ...... F02C 7/06; F02C 7/28; F02C 7/36; F01D 25/18; F01D 25/183; F01D 25/186; F01D 25/20; F05D 2260/6022; F05D 2260/602; F05D 2260/98; F05D 2220/32
See application file for complete search history.

(56) References Cited

U.S. PATENT DOCUMENTS

| | | | |
|---|---|---|---|
| 2,391,000 A | 3/1942 | Allen | |
| 3,472,024 A | 10/1969 | Strub | |
| 4,424,973 A * | 1/1984 | Heilala | F16J 15/3492 277/318 |

(Continued)

FOREIGN PATENT DOCUMENTS

| | | |
|---|---|---|
| CN | 1693685 A | 11/2005 |
| WO | 2016148329 A1 | 9/2016 |

*Primary Examiner* — Todd E Manahan
*Assistant Examiner* — Rodolphe Andre Chabreyrie
(74) *Attorney, Agent, or Firm* — Norton Rose Fulbright Canada LLP.

(57) ABSTRACT

A method of monitoring a sealing component of a gas turbine engine, comprising: collecting oil leaked from the component; detecting a volume of the collected oil upstream of an oil return path of the gas turbine engine; and signalling for inspection of the component when the volume of the collected oil exceeds a threshold volume. Also disclosed is an oil leakage monitoring system for a gas turbine engine, comprising: one or more sealing components to be lubricated by oil; a valve downstream of the one or more components and fluidly connected to an oil system; a reservoir downstream of the one or more components to collect oil, the reservoir upstream of the valve; and a volume measurement device configured to detect the oil collected in the reservoir, and to signal for inspection of the one or more components when the oil collected in the reservoir exceeds a threshold volume.

19 Claims, 4 Drawing Sheets

(56) References Cited

U.S. PATENT DOCUMENTS

| | | | |
|---|---|---|---|
| 4,722,663 A | 2/1988 | Swearingen | |
| 4,872,976 A | 10/1989 | Cudaback | |
| 5,031,509 A | 7/1991 | Cowan | |
| 5,046,306 A | 9/1991 | Borre, Jr. | |
| 5,595,472 A | 1/1997 | Quattrociocchi | |
| 6,463,819 B1 | 10/2002 | Rago | |
| 7,941,996 B2 | 5/2011 | Bovina et al. | |
| 8,561,397 B2 | 10/2013 | Egedal et al. | |
| 2013/0280043 A1* | 10/2013 | Parnin | G01M 3/2869 |
| | | | 73/40 |
| 2017/0298792 A1* | 10/2017 | Blais | F16N 31/00 |
| 2018/0334917 A1* | 11/2018 | Nanda | G01K 7/425 |
| 2020/0191276 A1* | 6/2020 | Kopp | F16J 15/3492 |

* cited by examiner

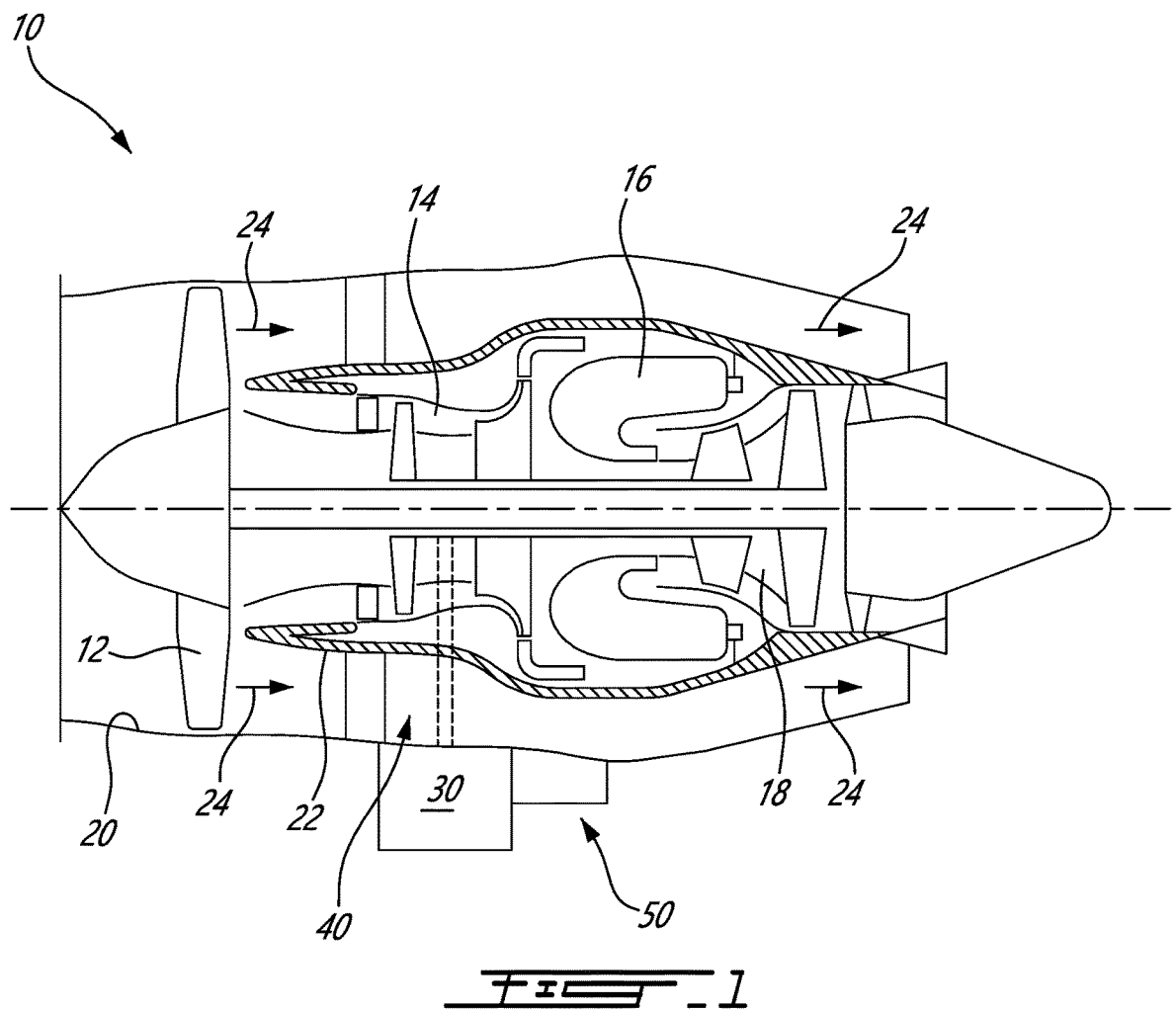

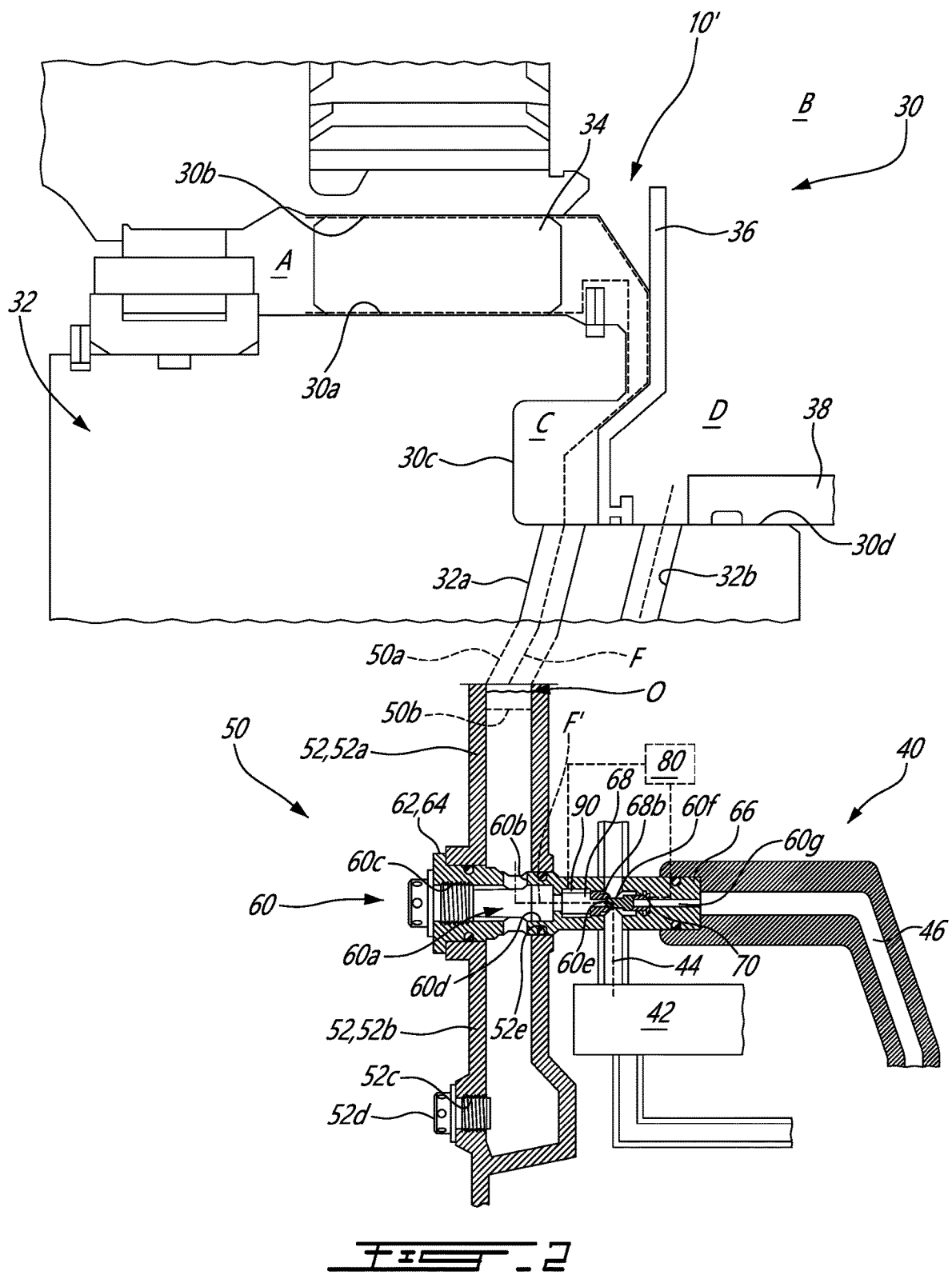

OIL LEAKAGE MONITORING SYSTEM

CROSS-REFERENCE TO RELATED APPLICATIONS

This application claims priority to U.S. provisional patent application 62/976,741 filed Feb. 14, 2020, the entire contents of which are incorporated by reference herein. Reference is also made to U.S. patent application Ser. No. 15/131,736, the entire contents of which are incorporated by reference herein.

TECHNICAL FIELD

The application relates generally to oil systems used in gas turbine engines and, more particularly, to oil leakage monitoring systems and methods of monitoring sealing components of gas turbine engines.

BACKGROUND

Gas turbine engines employ high-speed rotating parts such as bearings. These parts may require a supply of oil for lubrication and cooling. Oil systems are used to provide oil to these parts. Oil seals are commonly used to retain oil within cavities and/or to prevent oil leakage. However, oil may still leak and accumulate in different areas of the engine. Typically, leaked oil is drained into cavities or tanks to be removed or scavenged by the operator. Leaked oil can also drain over external parts of the engine. Under certain circumstances, oil recuperation systems may recover a portion of the leaked oil to return it to the oil systems.

SUMMARY

In an aspect of the present technology, there is provided an oil leakage monitoring system for a gas turbine engine, comprising: one or more sealing components to be lubricated by oil; a valve downstream of the one or more sealing components and fluidly connected to an oil system of the gas turbine engine; a reservoir disposed downstream of the one or more sealing components to collect oil leaked from the one or more sealing components, the reservoir disposed upstream of the valve; and a volume measurement device configured to detect the oil collected in the reservoir, the volume measurement device configured to signal for inspection of the one or more sealing components when the oil collected in the reservoir exceeds a threshold volume of oil.

In another aspect, there is provided an oil leakage monitoring system for a gas turbine engine, comprising: one or more sealing components to be lubricated by oil; a valve downstream of the one or more sealing components and fluidly connected to an oil system of the gas turbine engine; a reservoir disposed downstream of the one or more sealing components to collect oil leaked from the one or more sealing components, the reservoir disposed upstream of the valve; and a volume measurement device configured to detect the oil collected in the reservoir, the volume measurement device configured to signal for inspection of the one or more sealing components when the oil collected in the reservoir exceeds a threshold volume of oil.

DESCRIPTION OF THE DRAWINGS

Reference is now made to the accompanying figures in which:

FIG. 1 is a schematic cross-sectional view of a gas turbine engine;

FIG. 2 is a schematic cross-sectional view of a portion of the engine of FIG. 1 including an accessory gearbox and an oil leakage monitoring system;

DETAILED DESCRIPTION

Figure 2A:
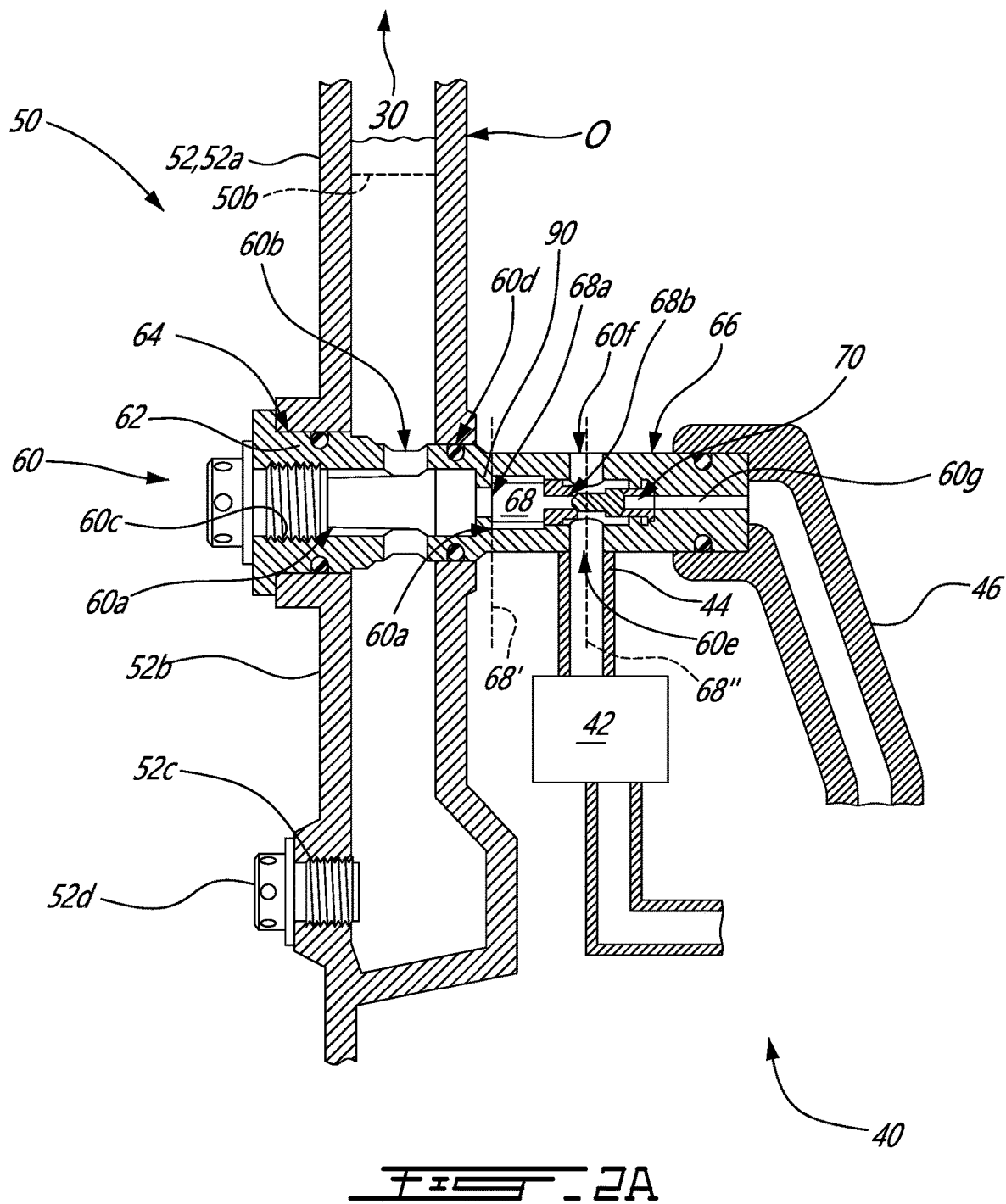
FIG. 2A is an enlarged view of part of the oil leakage monitoring system of FIG. 2.

The present application relates to oil leakage recovery technology provided for gas turbine engines such as for example that disclosed in U.S. patent application Ser. No. 15/131,736, the entire contents of which are incorporated by reference herein.

FIG. 1 illustrates a cross-section a gas turbine engine 10 of a turbofan type preferably provided for use in subsonic flight. The engine 10 generally comprises in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The engine 10 includes a nacelle 20 or outer casing surrounding an inner casing 22 enclosing a core of the engine 10. The nacelle 20 is spaced from the inner casing 22 providing an annular bypass passage for flow of air 24 from the fan 12 to the exhaust of the engine. The engine 10 also includes accessories, such as an accessory gearbox 30 (referred to henceforth as "the gearbox 30") disposed proximate or inside the nacelle 20 and connected to either one of the compressor 14 and the turbine section 18 so as to be driven thereby.

In the forthcoming description, "vertical" refers to an orientation that is generally parallel to that along which gravity and opposing forces act, with "down" corresponding to a direction of the gravity force, i.e., generally toward a notional planar, horizontal ground surface, and "up" corresponding to an opposite direction, i.e., generally away from the ground surface. Whenever used in connection to the engine 10, such terminology should be understood, unless stated otherwise, to be relative to the ground surface as if the engine 10 were to be installed on an aircraft parked on the ground surface. Likewise, flight conditions of the aircraft are to be understood as if the aircraft were to be airborne with an upside thereof facing up.

Several mechanical components of the engine 10 are prone to friction and/or to heating, and are thus preferably lubricated and/or cooled by a fluid, for example oil supplied by an oil system 40 of the engine 10. Surfaces of such mechanical components (e.g. surfaces 30a, 30b, 30c, 30d) exposed to such oil are conventionally characterised as "wet". For instance, as shown in FIG. 2, the gearbox 30 is fluidly connected to the oil system 40 so that some such surfaces of the gearbox 30 (e.g., surfaces 30a, 30b) can be lubricated with oil. Some such surfaces of the gearbox 30 also define cavities (e.g., cavities A, B, C, D) in which oil may collect or pool. Namely, the surface 30a corresponds to an interior surface of a mounting structure 32 of the gearbox 30 that surrounds the cavity A, a bore-like opening that extends generally horizontally. An annular component of the gearbox 30, in this case a face seal 34, is fitted into the cavity A, and another annular component, a gear ring of which an outer circumferential surface corresponds to the surface 30b, is fitted into the face seal 34. The surface 30b is located radially inward relative to the surface 30a, defining an annular portion of the cavity A between the surfaces 30a, 30b receiving the face seal 34. Hence, the face seal 34 may be said to separate, or seal, the annular portion of the cavity A from the adjacent cavity B. The face seal 34 is one of several seal-type mechanical components, sometimes referred to herein as sealing components, that furnish cavities of the gearbox 30 so as to block, hinder, or direct oil. For example, sealing components suitable for use in the gearbox 30 include plugs, spigots, other types of seals such as labyrinth seals, and baffles. A bottom portion of the cavity B is defined in part by the wall-like surface 30c, which extends generally transversely relative to the surface 30a, and thus generally vertically, and by the floor-like surface 30d, located lower than the cavity A and extending generally transversely away from the surface 30c. The bottom portion of the cavity B may be said to be generally lower than the cavity A, such that oil leaking from the cavity A and past the face seal 34 may gravitationally run toward the bottom of the cavity B. The cavity B of the mounting structure 32 may thus be said to function as an oil collector 10' of the engine 10. In this implementation of the gearbox 30, a baffle 36 extends vertically inside the cavity B from the bottom of the cavity B to a location upward of the surface 30a, partitioning the cavity B so as to form a cavity C on a side of the baffle 36 facing toward the cavity A, and a cavity D on an opposite side of the baffle 36 facing away from the cavity A. The cavity C and the cavity D are each provided with a drain 32a, 32b formed in the mounting structure 32 at the bottom of the cavity B so as to be gravitationally drainable, in this case separately. The baffle 36 may thus discourage oil having leaked from the face seal 34 to bypass the cavity C and the drain 32a and, conversely, may discourage oil having pooled in the cavity D from draining via the drain 32a. Stated otherwise, the baffle 36 is arranged to isolate oil having leaked from the face seal 34 from a remainder of the oil collected via the cavity B. As such, the cavity C may be referred to as a portion of the oil collector 10' dedicated to collecting oil having leaked from a specific sealing component (e.g., the face seal 34). In this implementation, the face seal 34 is radially inward of a stationary component, i.e., the surface 30a of the mounting structure 30, and radially outward of a rotating component, i.e., the surface 30b of the gear ring. It should be noted however that the face seal 34 could otherwise be fitted radially between other components (e.g., shafts, bearings, etc.), in some cases radially inward of a rotating component and radially outward of a static component. As some of the above-mentioned sealing components typically undergo high stress during operation of the engine 10 due to the high-energy conditions and high pressure in cavities within which oil can pool. Since these sealing components operate at high pressures, oil may be caused to leak across the sealing component. A small amount of oil leaked across the sealing component is anticipated and tolerated. However, in instances where the sealing component is damaged or defective, the oil leaked across the sealing component may increase the oil consumption of the gas turbine engine because the leaked oil is typically collected into cavities to be ultimately scavenged. Furthermore, excessive leaked oil resulting from a damaged sealing component may even drain over external parts of the engine.

The oil system 40 and other features disclosed herein return leaked oil to the oil system 40, and also monitor the sealing components for leakage to ensure that they are functioning correctly.

An oil leakage monitoring system 50 (sometimes referred to herein simply as "monitoring system 50") is associated with the gearbox 30. It shall be noted that besides or in addition to the sealing components of the gearbox 30, the monitoring system 50 may be implemented, mutatis mutandis, in connection to other oil collectors 10' of the engine 10 and/or to monitor other mechanical components for leakage, for instance components located elsewhere in the engine 10 such as in the compressor section 14 or in the turbine section 18.

Referring to FIG. 2, the monitoring system 50 is located downstream of the oil collector 10' that is associated with the one or more sealing components of the engine 10 being monitored for leakage. In some embodiments, the oil collector 10' may be aerodynamically integrated to the engine 10, for example in the nacelle 20 and/or the inner casing 22 and in fluid communication with the bypass passage so as to capture oil droplets conveyed in the flow of air 24 passing therealong after having leaked from wet components of the engine 10. The monitoring system 50 includes one or more oil collection conduits provided to route oil away from the oil collector 10'. One such collection conduit is schematically shown at 50a. In some embodiments, a structure of the engine 10 which functions as an oil collector 10', for example the mounting structure 32 of the gearbox 30, is a part of the monitoring system 50 that is integral to one or more of such collection conduits. In embodiment, the sealing components, such as the face seal 34 for example, is a component of the monitoring system 50. In some such embodiments, the drain 32a is one such collection conduit or part thereof. A downstream-most collection conduit of the monitoring system 50 forms a reservoir 52. The collection conduit 50a, like any other collection conduit provided upstream of the reservoir 52, is arranged so as to drain into the reservoir 52 via gravity. In other embodiments, the reservoir 52 is fitted to the mounting structure 32 so as to be immediately downstream of the cavity C, and the drain 32a and the collection conduit 50a are omitted. A fluid communication path routed from the face seal 34 (or another sealing component of the engine 10, as the case may be) to the reservoir 52 may be referred to as an oil collection path F.

The monitoring system 50 is provided to collect and hold oil received from the sealing component via the oil collection path F in the reservoir 52, and to selectively flow a measured quantity of oil from the reservoir 52, which may be some or all of the collected oil, to downstream of the reservoir 52 for such quantity of oil to be returned to the oil system 40. As will be described hereinbelow, the monitoring system 50 measures and returns oil in a controlled manner, helping to characterize leakage not only with respect to the sealing component or other wet component being monitored, but also with respect to operating conditions of the engine 10.

FIG. 2 shows one exemplary structural arrangement of the oil recuperation system 50, characteristics of which will now be described. The reservoir 52 is a hollow body forming an interior cavity, and constructed so as to be suitable for holding oil. In the particular embodiment shown, the reservoir 52 is constructed of cast metal. Alternatively, other manufacturing techniques can be used to form the reservoir 52, such as machining, and other materials can be used, such as composites and polymers, instead of or in addition to metallic materials. In embodiments, the reservoir 52 is one of multiple reservoirs of the monitoring system 50. In such embodiments, these multiple reservoirs can be disposed in parallel to collect distinct flows of oil. In other such embodiments, two or more of these multiple reservoirs can be fluidly interconnected to allow collected oil to flow downstream relative to an upstream-most one of such reservoirs toward another one of such reservoirs at a downstream end of the oil collection path F.

The reservoir 52 of FIG. 2 can be said to form a downstream end of the oil collection path F. A neck 52a of the reservoir 52 is provided downstream of the collection conduit 50a. Each of the collection conduit 50a and the neck 52a are shown as having a straight tubular shape with a cylindrical peripheral wall. The neck 52a is oriented vertically, whereas the collection conduit 50a extends at an angle relative to the neck 52a and to the vertical orientation of the engine 10. Either one or both of the collection conduit 50a and the neck 52a may be shaped and/or oriented otherwise so long as they are drainable via gravity. For example, the collection conduit 50a and the neck 52a may be composed of a plurality of conduit segments connected end to end, and any one or more of such segments may have a non-circular cross-sectional profile, a tapering cross-sectional profile, and may extend at a non-vertical angle. In this exemplary configuration, the reservoir 52 includes a receptacle 52b arranged so that oil draining from the neck 52a via gravity may pool into the receptacle 52b. Proximate the neck 52a, a top portion of the receptacle 52b has a shape and an orientation that conform to those of the neck 52a. The receptacle 52b also has a bottom portion sized for a greater exterior footprint and capacity relative to the top portion. Depending on the implementation, various sizes and shapes are suitable for the receptacle 52b, some of which exhibit a consistent shape and orientation across an entire height of the receptacle 52b (i.e., across both the top and bottom portions of the receptacle 52b). An overall shape and size of the reservoir 52 defines a total capacity of the reservoir 52, i.e., a total amount of a volume enclosed by the reservoir 52 that may be occupied by oil absent any overflow of oil upstream of a certain location corresponding to a graded level 50b of the monitoring system 50. In this embodiment, the graded level 50b corresponds to a level proximate to an inlet of the neck 52a. Upon oil collected in the reservoir 52 rising from a bottom of the reservoir 52 to above the graded level 50b, such as to level generally shown at 0, the volume of oil collected corresponds to a volume deemed to warrant inspection of the sealing components. Downstream of the graded level 50b, the reservoir 52 has at least one opening that is fitted with a closure suitable for selectively draining oil from the reservoir 52. For instance, the reservoir 52 includes a drain outlet 52c located in the receptacle 52b to allow oil to be drained, or flushed, from the reservoir 52. A drain plug 52d is removably fitted to the drain outlet 52c, allowing to selectively open the drain outlet 52c upon removal of the drain plug 52d. In the embodiment shown, the drain outlet 52c is arranged on a lateral wall of the receptacle 52b proximate a bottom thereof. Hence, the reservoir 52 is arranged such that when the engine 10 is horizontally oriented, for example when the aircraft to which the engine 10 is mounted is grounded, the reservoir 52 is oriented vertically, with the neck 52a positioned above the receptacle 52b. This orientation of the reservoir 52 allows oil leakage and in some cases solid debris received by the reservoir 52 to settle and accumulate in the receptacle 52b upon the drain outlet 52c being closed, and to be retrievable from the receptacle 52b via the drain outlet 52c when the drain plug 52d is removed. Also, depending on the opening of the reservoir 52, different types of closures may be used. For instance, the drain plug 52d used as the closure for the drain outlet 52c is of a screwable type. Nevertheless, other types of plugs may also be used such as mechanical, press-fitted plugs, so long as suitable sealing and wear-resistance performance is achieved. Downstream of the graded level 50b, the reservoir 52 defines a socket 52e and is provided with a valve 60 of the monitoring system 50 received by the socket 52e, thus referred to as a valve socket 52e. In this embodiment, the valve socket 52e is a through opening (or valve opening 52e) extending across the reservoir 52 from side to side, below the neck 52a and above the receptacle 52b. The reservoir 52 may be said to form an upstream end of a oil return path F' of the monitoring system 50. The valve 60 may be said to form a selectively closable portion of the oil return path F' extending from the reservoir 52 to the oil system 40. The drain opening 52c and the valve socket 52e may respectively be said to form a draining outlet of the monitoring system 50. In embodiments including that depicted in FIGS. 2 and 2A, the oil collected in the reservoir 52 first fills the receptacle 52b. The collected oil accrues vertically from a bottom of the receptacle 52b, across the valve socket 52e, into the neck 52a until it reaches the graded level 50b.

Referring to FIG. 2, structural characteristics of the depicted exemplary implementation of the valve 60 will now be described. The valve 60 has a housing 62 defining a chamber 60a of the valve 60 in fluid communication with an interior of the reservoir 52. The valve 60 extends generally transversely to the reservoir 52. The valve 60 is arranged relative to the reservoir 52 such that the neck 52a and the receptacle 52b respectively extend upwardly and downwardly relative to a horizontal dimension of the housing 62. The housing 62 is generally cylindrical in shape, and extends between opposite first and second ends of the valve 60. A first portion 64 of the housing 62 defining the first end of the valve 60 extends inside the reservoir 52. At the first end, the first portion 64 forms a shoulder seated onto an outer, complementarily-shaped surface of the reservoir 52 surrounding a first end, or opening, of the valve socket 52e. Past the shoulder, the first portion 64 is received inside the reservoir 52 via the valve socket 52e. A second portion 66 of the housing 62 defining the second end of the valve 60 extends from the first portion 64 inside the reservoir 52 to outside the reservoir 52 via a second end, or opening, of the valve socket 52e. The first portion 64 of the housing 62 may be said to be embedded into the reservoir 52, whereas the second portion 66 may be said to project outwardly from the reservoir 52. Hence, the first portion 64 provides the fluid communication with the interior of the reservoir 52 by way of a port of the valve 60 referred to as a first, upstream port 60b. The upstream port 60b, in this case a vertically-oriented through opening defined in the housing 62, has opposite ends in fluid communication with one another and respectively with the neck 52a and the receptacle 52b. It should be noted that at the first end of the valve 60, the housing 62 defines an access port 60c fluidly connected between outside the reservoir 52 and the chamber 60a at a location downstream of the upstream port 60b. The access port 60c of the valve 60 is fitted with a closure similar to the drain plug 52d. Other types of closures are possible to close the access port 60c. In one exemplary configuration, the drain opening 52c and the first end of the valve socket 52e via which the first portion 64 of the valve 60 is received are located on a same side of the reservoir 52. Such configuration may enable or facilitate servicing of the reservoir 52 or of other nearby components of the monitoring system 50. In some other embodiments, the valve 60 is permanently closed at the first end, and the access port 60c and the corresponding closure are omitted. In some such embodiments, the valve socket 52e is a blind opening having a sole open end (i.e., the second end), via which the second portion 66 of the valve 60 is received. The housing 62 defines an upstream-most portion of the oil return path F', in the form of a port 60d of the valve 60 that is disposed close to, and in this case generally flush with, a side of a peripheral wall of the reservoir 52 on which the open end of the valve socket 52e is disposed. The port 60d corresponds, in the present embodiment, to a notional limit between a first portion and a second portion of the chamber 60a respectively defined in the first and second portions 64,66 of the valve 60, and may be referred to as a second, downstream port 60d. A capacity of the chamber 60a upstream of the downstream port 60d may, depending on the implementation, be integral to the capacity of the reservoir 52.

The first portion 64 of the valve is sized for receiving a filter via the access port 60b. The filter is fitted to the chamber 60a so as to extend from the plug in the access port 60b to the downstream port 60d. In this particular arrangement, the housing 64 is larger near the first end of the valve 60 than it is near the second end. In embodiments, the housing 62 can be structured and/or shaped otherwise. For instance, the housing 62 may be formed of distinct first and second portions 64, 66 mechanically joined to one another, for instance via complementary flanged ends. In embodiments, elements of the first portion 64 of the valve 60 located upstream from the downstream port 60d are omitted, and the downstream port 60d corresponds to an inlet port 60d of the valve 60. In some embodiments, the reservoir 52 defines a reservoir port in fluid communication between the reservoir 52 and a valve port defined in a flanged end of the housing 62 downstream of the reservoir 52.

Referring to FIG. 2A, at a location spaced away from the downstream port 60d, the housing 62 defines at least one outlet port, in this case including a pair of outlet ports 60e, 60f, in fluid communication between the chamber 60a and a reservoir 42 of the oil system 40 via a return line 44. Here, a first 60e and a second 60f one of the outlet ports 60e, 60f respectively face downwardly and upwardly, with the first outlet port 60e draining into the return line 44 via gravity. Hence, the oil return path F' is formed successively by the reservoir 52, the upstream port 60b, the chamber 60a on either side of the downstream port 60d and the first outlet port 60e. The valve 60 is configurable between a first position in which the oil return path F' is closed at the valve 60 and a second position in which the oil return path F' is open. A portion of the chamber 60a extending from the downstream port 60d to past the first outlet port 60e is fitted with a slidable component, herein referred to as a piston 68 of the valve 60. The piston 68 is movable inside the chamber 60a to and fro the downstream port 60d to close and open the oil return path F'. The first position of the valve 60 corresponds to a first position 68' of the piston 68 relative to the housing 62 in which a first end 68a of the piston 68 seals the downstream port 60d, preventing oil from flowing from the reservoir 52 to the first outlet port 60e. The second position of the valve 60 corresponds to a second position 68" of the piston 68 (schematically shown in FIG. 2A) in which the first end 68a of the piston is spaced away from the downstream port 60d, wherein oil flowing from the reservoir 52 may flow through the downstream port 60d and around the first end 68a of the piston 68 to reach the second outlet 60e.

The implementation of the valve 60 described hereinabove and shown in the Figures is merely one exemplary type of valve among those suitable for opening and closing the oil return path F'. For instance, gate and butterfly valves, among other types, may be used. In this implementation, the valve 60 is operable via a hydraulically-driven actuator, generally shown at 70. The actuator 70 is driven by pressurized oil via conduit 60g inside the second portion 66 of the housing 62. Opposite ends of the conduit 60g are respectively fluidly connected to the actuator 70 and to a pressurized oil line 46 of the oil system 40. Further details pertaining to hydraulic actuation of the valve 60 are provided in U.S. patent application Ser. No. 15/131,736. In one configuration, the piston 68 is biased toward the second position 68", for example mechanically by way of a resilient element, electromagnetically, or by any other suitable means for exerting a biasing force on the piston 68. The actuator 70 is operable to selectively impart the piston 68 with an actuation force of a magnitude sufficient to overcome the biasing force and thus to move, or maintain, the piston 68 in the first position 68'.

Other configurations are possible, including some in which the piston 68 is biased toward the first position 68' and/or actuable toward the second position 68". In some embodiments, the force urging the piston 68 toward the first position 68' is of a magnitude selected to correspond to that of an opposing force resulting from pressure applied on the piston 68 by oil having accumulated in the reservoir 52 up to the graded level 50b. Hence, upon additional oil leaking into the reservoir 52, the resulting opposing force would be sufficient to overcome the biasing force and move the piston 68 to the open, second position 68". The valve 60 can also be arranged to function as a pressure sensor for sensing a pressure exerted inside the reservoir 52, for example the pressure exerted by the oil of the reservoir 52 onto the piston 68.

The valve 60 is provided with an electronic control means allowing to selectively position or hold the valve 60 in either the first or the second position. In some embodiments, the valve 60 is of a servo-controlled type that is movable between the first and second valve positions to a desired position and at a desired speed. In some such embodiments, the servo-controlled valve 60 is controllable to regulate a flow rate across the oil return path F'. Referring to FIG. 2, the valve 60 is controllable via a control unit 80, or controller 80, electronically connected to the valve 60. Depending on the implementation, the control unit 80 can be integral to a main control system of the engine 10 tasked to launch and monitor the various stages of each operation cycle of the engine 10, including startup, flight and shutdown stages. The control unit 80 can instead be integral to the monitoring system 50, as in the depicted implementation, and in some cases be dedicated to controlling the valve 60. In some implementations, the control unit 80 is configured to control the valve 60 by selectively varying the magnitude of either one or both of the biasing force and the actuation force, as the case may be. In other implementations, the valve 60 is electrically actuated, and the pressurized line 46 is omitted. The control unit 80 is electronically connected to the main control system of the engine 10, and configured to receive a signal indicative of operating characteristics of the engine 10 which can include the stage of an ongoing or upcoming operation cycle and/or other characteristics such as an engine rotation speed, a pressure or a temperature taken for example upstream or downstream of the sealing component being monitored for leakage.

Hence, the control unit 80 can be configured to control the valve 60 to open or close the oil return path F' for example before, during or upon completion of a certain stage of an operation cycle, upon completion of a full operation cycle, or upon completion of a certain operation duration which may be set to begin or end during a stage or in between cycles.

For instance, in certain implementations, the control unit 80 is configured to control the valve 60 so as to close the oil return path F' from the onset of a given operation duration of the engine 10 (i.e., the given duration), and to maintain the valve 60 closed over the course of the given duration. As such, provided that the reservoir 52 is empty of oil and that any other draining outlet of the reservoir 52 is closed upon closure of the oil return path F', any oil held in the reservoir 52 at completion of the given duration corresponds to oil having leaked from the sealing component being monitored over the course of the given duration. Such volume of oil can be referred to as a leaked volume which, divided by the given duration, yields a leakage rate. Some sealing components can be characterized by a threshold leakage rate, i.e., a volumetric rate value at which any increase in leakage is indicative of degradation or malfunction of the corresponding sealing component(s).

The monitoring system 50 also includes a volume measurement device 90 operatively connected to the reservoir 52 so as to be indicative of a volume of oil held inside the reservoir 52. Stated otherwise, the volume measurement device 90 is configured to signal for inspection of the sealing components when the volume of oil collected inside the reservoir 52 exceeds a threshold volume of oil. The threshold volume corresponds to a threshold leakage rate, i.e., a volumetric leakage rate of a value indicative of seal degradation, multiplied by the given duration. Signalling for inspection may include any type of indication or alert, visual and/or audible, on any suitable medium, intended to inform maintenance or other personnel of a need to inspect the integrity and working order of the sealing component associated with the volume measurement device 90. Depending on the implementation, such indication can be provided locally, i.e., at or in the vicinity of the volume measurement device 90. The indication can otherwise be remote, in which case the volume measurement device 90 is configured for sending an electronic signal indicative of the need for inspection to a monitoring device, such as a computer or display, which may be located for example inside the cabin of the aircraft. In some implementations, local and remote indications of the volume of oil held inside the reservoir are provided via the volume measurement device 90. In either case, the operation of the volume measurement device 90, of the valve 60 and of the engine 10 can be coordinated such that the volume of oil indicated by way of the volume measurement device 90 can be related to the given duration to determine the leaked volume. Once determined, the leaked volume can then be compared to the threshold volume. In embodiments, the control unit 80 is arranged to determine the operating duration a posteriori, i.e., based on a duration start and a duration end. The duration start can correspond to a time of closing of the oil return path F' (e.g., the time at which the control unit 80 sends a signal for the valve 60 to move in the first position, or receives a signal indicative of the valve 60 being in the first position) or to a time of start up of the engine 10. The duration end can correspond to a time of opening of the oil return path F' (e.g., the time at which the control unit 80 sends a signal for the valve 60 to move in the second position, or receives a signal indicative of the valve 60 being in the second position), to a time of the volume of collected oil exceeding the threshold volume (e.g., the time at which the control unit 80 receives a signal indicative of the volume measurement device 90 having detected oil in excess of the threshold volume), or to a time of shut down of the engine 10. In embodiments, the monitoring system 50 is arranged such that the valve 60 opens for a duration sufficient for the reservoir 52 to drain via the oil return path F' upon detection of the threshold volume being exceeded. The monitoring system 50 also records a timeline of openings of the valve 60 (or valve operation timeline) and/or a timeline of detections by the volume measuring device 90 which can, for example via the control unit 80, be related to a timeline of operation of the engine 10 (or engine operation timeline) to determine how many times the threshold volume has been returned to the oil system 40 over any specific portion (or operating duration) of the engine operation timeline. Accordingly, the leakage rate can be determined for such specific operating duration.

Depending on the embodiment, various types and configurations of the volume measurement device 90 may be provided in the monitoring system 50. Referring to FIGS. 2 and 2A, the volume measurement device 90 is of a pressure-sensing type, namely one that includes a pressure sensor being a part of the valve 60 as described hereinabove. Due to the valve 60 being located higher than the receptacle 52b, the volumetric capacity of the receptacle 52b is accounted for in determining the leaked volume in addition to a volume derived from a pressure sensed in the reservoir 52 via the valve 60. In other embodiments, the volume measurement device 90 includes one or more pressure sensors located at the bottom of the reservoir 52.

In one possible arrangement of sealing components, the threshold volume is about 60 cubic centimetres (cc) of oil, and corresponds to four sealing components respectively leaking at a leakage rate of 5 cc/hour, over a 3-hour duration which represents one complete operation cycle of the engine 10. Should a leakage volume greater than the threshold volume be found to occur, the measurement of such leakage volume may serve as an indication that at least one of the sealing components being monitored is showing signs of reduced effectiveness and may need to be replaced or otherwise serviced within a predetermined schedule. Hence, the oil leakage monitoring system 50 can be said to aid in monitoring the performance of the sealing components to anticipate failure and plan maintenance of the sealing components.

Depending on the arrangement of the sealing components and corresponding oil collector 10', some oil retention may occur upstream of the reservoir 52, i.e., some of the oil having leaked during a given operation duration may remain upstream of the graded level 50a upon completion of the operation duration. A pre-determined retention capacity of the oil collector 10' may thus be accounted for in determining the leaked volume to account for oil retention.

In embodiments in which the volume measurement device 90 is electronically-operated, the monitoring system 50 is provided with a processor configured to perform calculations to determine the leakage volume and/or the leakage rate, based on signals received from the volume measurement device 90. Depending on the embodiment, the control unit 80 includes one or more processors, and a non-transitory computer-readable memory communicatively coupled to the one or more processors, and comprising computer-readable program instructions executable by the one or more processors to perform tasks related to monitoring sealing components for oil leakage. In some such embodiments including those depicted in FIGS. 2 and 3, the control unit 80 has the processor configured to perform the calculations. Nevertheless, it shall be noted that in other such embodiments, the processor configured to perform the calculations is a part of the volume measurement device 90. In yet other embodiments, the processor configured to perform the calculations is remote from the monitoring system 50, for example either elsewhere on the aircraft or at a ground-based location.

Figure 3:
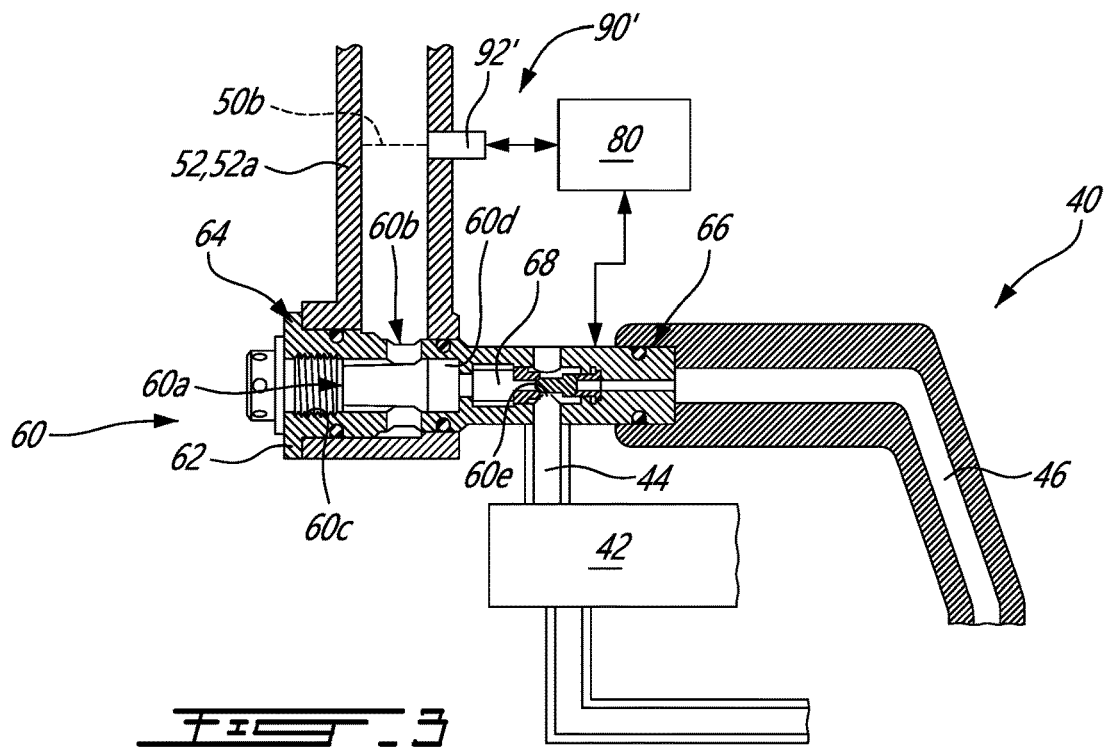
FIG. 3 is a schematic cross-sectional view of another embodiment of the oil leakage monitoring system.

Characteristics of additional embodiments of the monitoring system 50 depicted in FIGS. 3 and 4 will now be described. Features of the embodiments respectively shown in FIGS. 3 and 4 have the same reference numbers as similar features of the embodiment of the monitoring system 50 shown in FIGS. 2 and 2A. Referring to FIG. 3, the valve 60 of the monitoring system 50 is located near a bottom of the reservoir 52, in this corresponding to the bottom of the neck 52a as the receptacle 52b is omitted. Nevertheless, in embodiments, the receptacle 52b, as shown in FIGS. 2 and 2A or shaped otherwise, can be provided as an integral, bottom part of either the reservoir 52 or the valve 60, or as an attachable component. For example, the receptacle 52b may in such cases be provided for the collection of solid debris which could otherwise be carried through the valve 60 with the oil as it is returned to the oil system 40.

The monitoring system 50 has a volume measurement device 90' including a sensor 92' of a proximity-sensing type adapted for detecting the presence of oil within a field of view, or operating range, of the sensor 90'. Depending on the embodiment, the sensor 92' is arranged to employ electromagnetic, acoustic (including ultrasonic) and/or capacitive components suitably arranged to detect the presence of oil. The sensor 92' is embedded in the peripheral wall of the reservoir 52 upstream of the valve 60. The sensor 92' is positioned such that the field of view encompasses or intercepts the graded level 50b. In this exemplary configuration, the sensor 92' is oriented horizontally, which may aid timeliness and accuracy of the detection of the volume of oil as it nears the graded level 50b.

The sensor 92' is electronically connected to the control unit 80 and arranged so as to send a signal to the control unit 80 upon detecting that the accumulation of oil in the reservoir 52 has attained the graded level 50b and exceeded the threshold volume. The signal communicated by the sensor 92' is thus indicative of oil leakage from the sealing components exceeding the threshold volume, and is thus indicative of a potential problem with one or more of the sealing components. In an embodiment, the signal can be sent, either directly or indirectly (for example via the control unit 80) to a control panel of the engine 10 or the aircraft to trigger a notification, such as a visual and/or auditory cue. In embodiments, the control unit 80 is operatively connected to the actuator 70 of the valve 60 and configured so as to prevent the valve 60 from opening (or moving to the first valve position) unless the control unit 80 has received the signal from the sensor 92' indicating that the threshold volume has been exceeded. In some such embodiments, the control unit 80 is configured to open the valve 60 (and thus the oil return path F') upon completion of a predetermined operation duration and upon reception of the signal from the sensor 92'. Hence, additional time in excess of the predetermined operation duration up until the control unit 80 receives the signal from the sensor 92' can be accounted for in the calculations performed to determine the leakage volume and/or the leakage rate.

Figure 4:
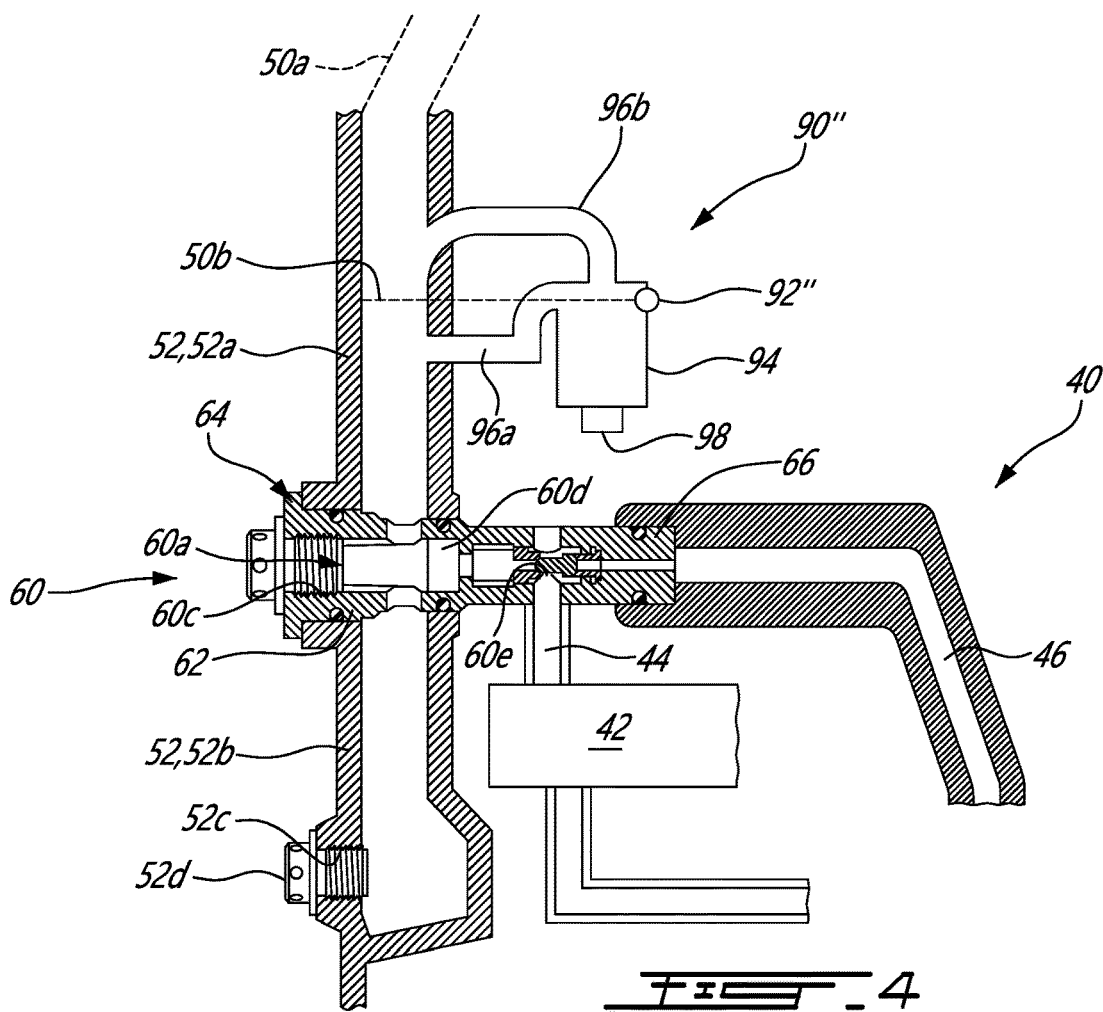
FIG. 4 is a schematic cross-sectional view of another embodiment of the oil leakage monitoring system.

Referring to FIG. 4, the monitoring system 50 has a volume measurement device 90" including a visual level indicator 92". The visual level indicator 92 is arranged to show, at a location outside the reservoir 52, an indication of whether oil inside the reservoir 52 has reached the graded level 50b. The visual level indicator 92" is thus disposed at a location that is accessible to a user such as maintenance personnel. The location of the visual level indicator 92" can be remote from the reservoir 52, for example onto a container 94 of the volume measurement device 90". In other embodiments, the visual level indicator 92" is instead disposed on the peripheral wall of the reservoir 52, for example at a location corresponding to that of the sensor 92' of FIG. 3. The location allows direct inspection of the graded level 50b, i.e., to see the graded level 50b within a field of view, or operating range, of the visual level indicator 92". The visual level indicator 92" is positioned such that the field of view encompasses or intercepts the graded level 50b. In this exemplary configuration, the visual level indicator 92" is oriented horizontally, which may aid timeliness and accuracy of the detection of the volume of oil as it nears the graded level 50b.

In this embodiment, the container 94 is fluidly connected to the reservoir 52 upstream of the valve 60. The visual level indicator 92", in this case provided in the form of a concave window bulging outwardly from the container 94, is also referred to as a bull eye. The visual level indicator 92" is disposed on a peripheral wall of the container 94, for example on a side of the container 94 facing away from the reservoir 52 or toward a suitable direction for facilitating visual inspection. Other types of visual level indicators 92" may be used, for example flush-mounted, porthole-like windows. Other shapes and sizes are also suitable for the visual level indicator 92", for example some that span a certain vertical dimension of the container 94 so as to allow monitoring of the oil as it accumulates therein. Yet other suitable types of visual level indicators 92" include devices having a display feature, such as a screen or panel, arranged to show a symbol, light or other visual cue associated with the oil level inside the reservoir 52.

The container 94 is sized and arranged relative to the reservoir 52 such that the reservoir 52 overflows into the container 94 as oil accumulates inside the reservoir 52 toward the graded level 50b. As such, the container 94 may be described as an overflow collector, or even as an overflow portion of the receptacle 52. It should be noted that the container 94 is arranged with respect to the reservoir 52 such that fluid communication therebetween is one of hindered or closed in certain conditions. For example, the container 94 is fluidly connected to the reservoir 52 via container conduits 96a, 96b of the volume measurement device 90". Reservoir-side ends of the container conduits 96a, 96b are connected to the reservoir 52 at a location upstream of the valve 60. The container conduits 96a, 96b include a first conduit 96a and a second conduit 96b whose reservoir-side ends are respectively connected to the reservoir 52 downstream of the graded level 50b and upstream of the graded level 50b.

The container conduits 96a, 96b are routed and/or shaped so as to discourage oil from flowing into the container 94 under certain circumstances upon oil having accrued inside the reservoir 52 up to a level short of the graded level 50b. Such circumstances include oil flowing downwardly across the graded level 50b, such as leaked oil flowing, or dripping, alongside the interior of the receptacle 52 and across the reservoir-side ends of the conduits 96a, 96b. Such circumstances also include oil momentarily flowing upwardly across the graded level 50b and the reservoir-side ends of the conduits 96a, 96b. Such upward flow can occur for example under negative G flight conditions, i.e., under downward acceleration that reduces or overcomes the downward-forcing effect of gravity on the oil. To discourage such undesirable oil flow toward the container 94, the conduits 96a, 96b each include a portion located higher than their respective reservoir-side ends. Various configurations of the conduits are possible, the depicted one being merely an exemplary one.

The reservoir 52 and the container 94 may be referred to as communicating vessels. The container 94 and the conduits 96a, 96b are arranged such that their respective levels of oil are efficiently balanced upon oil having accrued inside the reservoir 52 up to a level of at least the graded level 50b. The reservoir-side end of the first conduit 96a and an opposite, container-side end of the first conduit 96a respectively extend to below and above the graded level 50b. On the other hand, the reservoir-side end and a container-side end of the second conduit 96b are both located higher than the graded level 50b. This configuration of the container conduits 96a, 96b allows the container 94 to be filled via the first conduit 96a upon oil collected in the reservoir 52 reaching the graded level 50b and continuing to accrue. This configuration also allows the second conduit 96b to act as a vent, allowing air to exit the container 94 via the second conduit 96b as oil enters the container 94 via the first conduit 96a, thereby balancing out the pressures exerted at the air-oil interface inside the reservoir 52 and inside the container 94. In some embodiments, the first conduit 96a may be provided with a flap gate near the container 94, for example inside the container-side end of the first conduit 96a, to hinder oil backflow from the container 94 to the reservoir 52. Furthermore, the container 94 is arranged so as to be selectively drainable, for example via a drain 98. The drain 98 may either be plugged, or be fluidly connected to the oil system 40, for example via a valve configured to control drainage of the container 94 according to operating conditions of the engine 10 as described hereinabove with respect to the valve 60.

In embodiments, the monitoring system 50 is retrofitted to the engine 10, at least in part. In some such embodiments, retrofitting the monitoring system 50 to the engine includes connecting the reservoir 52 to the oil collector 10' and the valve 60 to the oil system 40 of the engine 10. In other such embodiments, retrofitting the monitoring system 50 to the engine 10 includes connecting the volume measurement device 90, 90', 90" to the valve 60 (FIG. 2.) or to the reservoir 52 (FIG. 3, FIG. 4) of the engine 10.

In accordance with another aspect of the present technology, some or all of the monitoring system 50 may be referred to as an oil leakage measurement system for an oil leakage recuperation system of the engine 10. The recuperation system can for example include the oil collector 10', the reservoir 52, the valve 60 and the return line 46. The measurement system includes the volume measurement device 90, arranged to be disposed upstream of the valve 60. The volume measurement device is configured to be indicative of a leakage volume of oil accumulated upstream of the valve 60 exceeding a threshold volume.

In some embodiments, the measurement system includes the control unit 80. The control unit 80 is connected to the volume measurement device 90 for receiving a signal indicative of the leakage volume and configured to be operatively connected to the valve 60 for regulating a flow downstream of the valve 60 based on the signal indicative of the leakage volume.

In some embodiments, the measurement system includes the container 94, configured for fluid communication with the reservoir 52 upstream of the valve 60 such that at least an overflow volume of the oil accumulated in excess of the threshold volume overflows into the container 94. In such embodiments, the volume measurement device 90 is connected to the reservoir 52 via the container 94 and arranged so as to be indicative of the leakage volume via the overflow volume.

In accordance with another aspect, there is provided a method of monitoring sealing components of the engine 10 consistent with operating principles of the monitoring system 50 described hereinabove with respect to FIGS. 2, 2A and 3, to be computer-implemented such as by way of the control unit 80 or other processor. In embodiments, the method provides for the volume measurement device 90 to signal for inspection of the sealing components electronically, for example via the control unit 80.

In accordance with yet another aspect, there is provided a method of monitoring sealing components of the engine 10 consistent with operating principles of the monitoring system 50 described hereinabove with respect to FIG. 4, to be implemented by operating or maintenance staff. In embodiments, the method provides for the volume measurement device 90 to signal for inspection visually upon direct inspection.

The aspects and embodiments described in the present disclosure provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of monitoring a sealing component of a gas turbine engine, the method comprising:
   collecting oil leaked from the sealing component;
   detecting a volume of the collected oil upstream of an oil return path of the gas turbine engine;
   signalling for inspection of the sealing component when the volume of the collected oil exceeds a threshold volume of oil; and
   closing the oil return path before starting up the gas turbine engine.

2. The method of claim 1, wherein the threshold volume of oil corresponds to a threshold leakage rate of the sealing component multiplied by an operation duration of the gas turbine engine.

3. The method of claim 1, comprising starting up the gas turbine engine before the collecting of the oil leaked from the sealing component.

4. The method of claim 3, further comprising shutting down the gas turbine engine before the detecting of the volume of the collected oil.

5. The method of claim 4, wherein the operation duration corresponds to a lapse of time between the starting up and the shutting down of the gas turbine engine.

6. The method of claim 1, comprising returning a portion of the volume of the collected oil via the oil return path of the gas turbine engine after the detecting of the volume of the collected oil.

7. The method of claim 6, comprising draining a remainder of the collected oil after the returning of the portion of the volume of the collected oil.

8. The method of claim 1, comprising opening the oil return path after the signalling for inspection of the sealing component.

9. The method of claim 8, comprising shutting down the gas turbine engine before the opening of the oil return path.

10. The method of claim 1, comprising determining whether the volume of the collected oil exceeds the threshold volume of oil by comparing the volume of the collected oil to the threshold volume.

11. The method of claim 10, wherein the determining of whether the volume of the collected oil exceeds the threshold volume includes determining the threshold volume based on an operation duration of the gas turbine engine and a threshold leakage rate of the sealing component.

12. The method of claim 10, wherein the detecting the volume of the collected oil includes obtaining a sensor signal indicative of the volume of the collected oil and determining the volume of the collected oil based on the sensor signal.

13. An oil leakage monitoring system for a gas turbine engine, comprising:
one or more sealing components to be lubricated by oil;
a valve downstream of the one or more sealing components and fluidly connected to an oil return path of an oil system of the gas turbine engine;
a reservoir disposed downstream of the one or more sealing components to collect oil leaked from the one or more sealing components, the reservoir disposed upstream of the valve;
a control unit operatively connected to the valve and configured to control the valve to close the oil return path before engine start up; and
a volume measurement device configured to detect the oil collected in the reservoir while the oil return path is closed by the valve, the volume measurement device configured to signal for inspection of the one or more sealing components when the oil collected in the reservoir exceeds a threshold volume of oil.

14. The oil leakage monitoring system of claim 13, wherein the volume measurement device includes a visual level indicator configured to directly signal for inspection.

15. The oil leakage monitoring system of claim 13, wherein the volume measurement device includes a sensor configured for sending a signal indicative of the oil collected in the reservoir exceeding the threshold volume of oil.

16. The oil leakage monitoring system of claim 15, wherein the valve is a servo-controlled valve including the sensor, the sensor configured for sensing a pressure generated by the oil collected in the reservoir.

17. The oil leakage monitoring system of claim 15, wherein the sensor is of a proximity-sensing type.

18. The oil leakage monitoring system of claim 13, wherein the volume measurement device includes a container and a conduit in fluid communication between the reservoir and the container, the container arranged to signal for inspection upon the oil collected in the reservoir attaining a graded level above the conduit, the reservoir arranged such that oil collected in the reservoir overflows to the collector via the conduit.

19. The oil leakage monitoring system of claim 18, wherein the conduit is a first conduit, the volume measurement device including a second conduit in fluid communication between the reservoir and the container above the graded level.

* * * * *